UNITED STATES PATENT OFFICE.

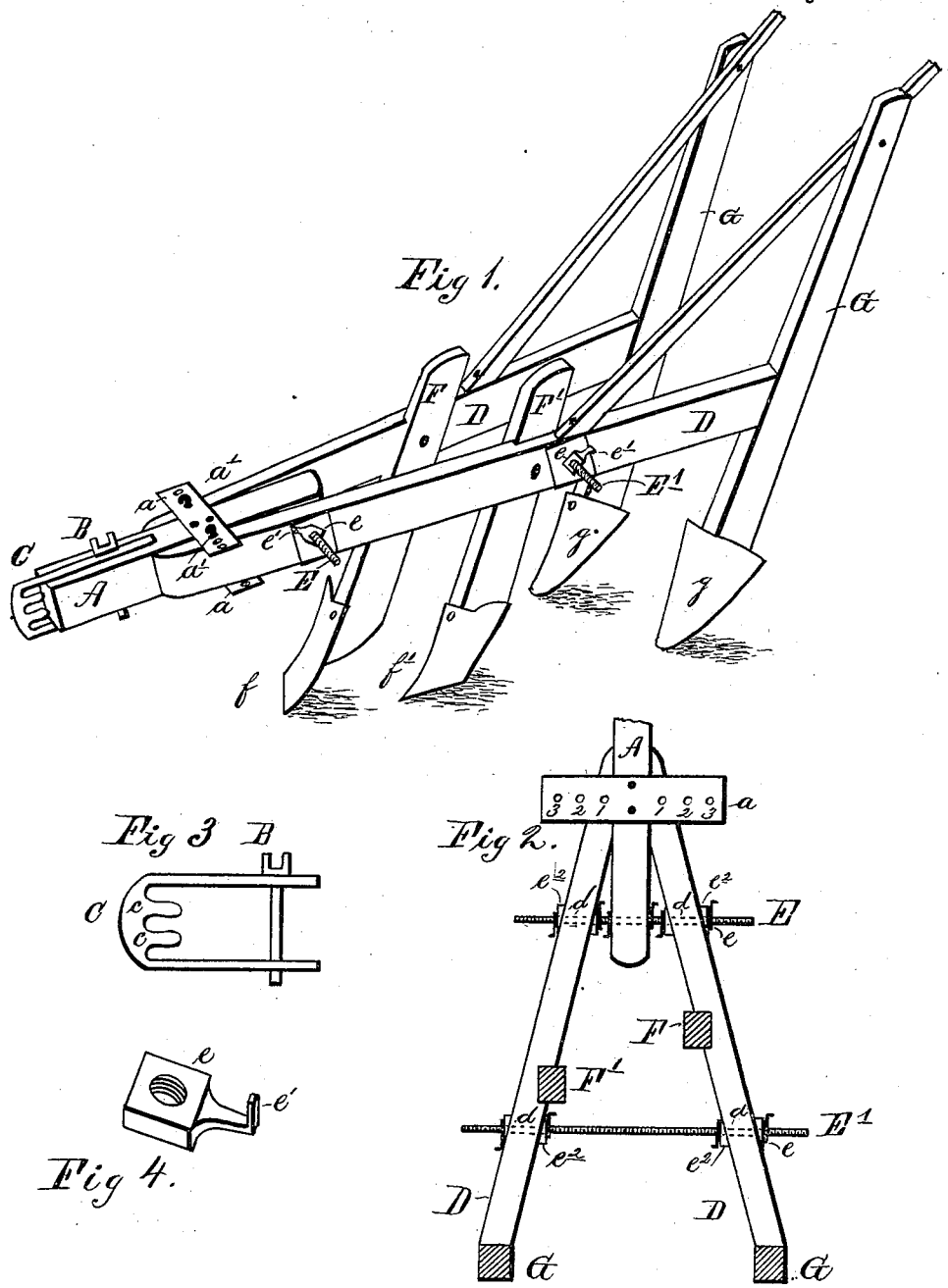

THOMAS H. BAIRD, OF WASHINGTON, ARKANSAS.

COTTON AND CORN CULTIVATOR.

SPECIFICATION forming part of Letters Patent No. 298,334, dated May 13, 1884.

Application filed June 22, 1883. (No model.)

*To all whom it may concern:*

Be it known that I, THOMAS H. BAIRD, a citizen of the United States, residing at Washington, in the county of Hempstead and State of Arkansas, have invented certain new and useful Improvements in Cotton and Corn Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cotton and corn cultivators; and it consists in a four-footed plow-stock, so constructed that the plows may be set wide apart or near each other, and at the same time keep the plow-points directed straight forward, or they may be set to point inward or outward, as more fully hereinafter explained. The cultivator is intended to run astride the row of cotton or corn. The straight edges of the two front plow-points, $f\ f'$, are turned in, so as to bar the cotton or corn off. The two rear plow-points, $g\ g$, immediately follow and hill the cotton or corn up. The main point in the cultivation of cotton is to get it "barred off and hilled up" at once, after which the farmer considers his crop comparatively safe. The front plows bar off and cover up the filth in the middle, and the sweeps $g\ g$ come behind and hill up, leaving the cotton perfectly clean, except in the immediate row. The cotton in this condition can stand, and will be in a growing condition for several days. It saves the labor of two horses and three men. Of course, as the stage of cultivation goes on and the season advances you can put any plow in that will suit best. To cultivate corn when young, put bull-tongues on front feet and straight shovels on rear feet, thereby cleaning the crop at once. If used to "bed up" with, shovel-plows can be put on all four feet, thereby throwing four furrows together and making a perfect bed. In breaking up land turning-plows can be used altogether. It can be used in various ways, but is gotten up more particularly for cotton.

In the accompanying drawings, Figure 1 represents a perspective view of my cultivator, a short piece of the handles being broken away. Fig. 2 represents a top plan view of the same, with part of tongue A cut away, and the upper ends of the feet also cut away. Fig. 3 represents my clevis and pin, the pin, however, being a wrench also. Fig. 4 represents the nuts used in connection with my cultivator.

In making my cultivator I take a beam of wood about three inches wide, four inches deep, and eighteen inches long for the tongue A. On the upper and under edges of this tongue, and about equidistant from either end, I securely rivet two plates of iron, $a\ a$. These plates are each about twelve inches long and two inches wide, and each have in either end a row of three holes, 1 2 3, equal distances apart, the holes in the lower piece corresponding with the holes in the upper piece.

To the front end of my tongue A, I pivot, by a pin or wrench, B, a clevis-iron, C. This clevis-iron has two fingers, $c\ c$, pointing inward or backward from the inside of its front end until they abut against the front end of the tongue A, so that when the ring of the double-tree is put in any one of the openings made thereby and the clevis is put on the tongue it cannot come out until the clevis is taken off again. These openings are for the purpose of assisting in regulating the depth of the plow-points. If the points are to be run deep, the ring is put in the top opening; if not so deep, then in the middle opening, and if shallow then in the lower opening. To this tongue A, I pivot between plates $a\ a$, with rods or pins $a'\ a'$, two beams, D D, which are about three feet long and the same size as the tongue, and extending backward and opening at their rear ends, forming an angle of about thirty degrees. About a foot from either end of these beams I make holes, (indicated by dotted lines $d$,) passing horizontally through these beams, and through which I insert threaded rods E E', their ends projecting from the outer face of these beams to allow of the cultivator being widened and the plow-feet set wider apart. The front rod, E, also passes through the rear end of the tongue A. On the inner and outer faces of these beams D, and around threaded rods E, are nuts $e$. These nuts have handles $e'$, that they may be turned with the hand. Between these nuts and the beam are V-shaped chips $e^2$, to level the surface for the face of the nuts to work against, and are nailed to the beams by brads. There are also nuts on the front rod, E, on either side of the rear end of the tongue A, to hold it steady, and to give the whole frame firmness and solidity.

On the inner face of each beam D, I secure two feet, F F', to which the front plow-points, $f f'$, are attached. The foot F is a little in advance of foot F', and the dirt thrown by point $f$ may spread out on the row, and the dirt thrown by point $f'$ will overlap it.

To the rear ends of beams D D are secured feet G G, to which are attached plow-points $g$ $g$. It will be observed by reference to Fig. 2 that these feet are so secured to the beam D that their front face is parallel with the threaded rods E. Thus the plow-points do not point inward on an angle with the beams D D, as with other cultivators, but straight to the front; and when the beams are set farther apart by moving the beams out to holes 2 or 3 the nuts $e$ are correspondingly turned out. Thus the plow-points are kept pointing straight to the front. In the cultivation of cotton and corn this is of great importance, for if the points were set wider apart by opening the beams at the rear ends only the plows would throw too much dirt inward and cover up the young crop, and the cultivator would run straight forward when the points were of equal depth in the ground; but if on a hillside the upper plow-points would be the deepest in the ground and the plow would constantly cut across the row and downhill, whereas when setting straight ahead the tendency would be to go straight forward.

In "bedding up" the frame may be widened at the rear end only, and thus all the points turned in and all the furrows thrown inward; and if the cultivator is to be run between the rows the front ends may be widened a little and the rear ends closed a little, and thus throw all the furrows outward and up to either row.

The nuts $e$ are all made the same size, so that, should they become too tight, from rust or otherwise, to be turned by hand, the wrench B, which is made to fit them, may be applied.

Having thus described my invention, what I claim as new and useful, and desire to secure by Letters Patent, is—

In a cotton and corn cultivator, as above described, the combination of plates $a$—one being rigidly secured on the upper and the other on the lower edge of tongue A—with pins $a'$ pivoting beams D at their front ends—one on either side of tongue A—with threaded rod E passing transversely through the front ends of said beams D and the rear end of tongue A, threaded rod E' passing transversely through the rear ends of said beams, and hand-nuts $e$ working on said threaded rods and against either side of said tongue, and against chips $e^2$, secured on the inner and outer sides of said beams D, all substantially as shown and described, and for the purposes set forth.

In testimony whereof I affix my signature in presence of two witnesses.

THOMAS HARDEN BAIRD.

Witnesses:
H. E. BURT,
J. W. BAIRD.